United States Patent Office 3,291,795
Patented Dec. 13, 1966

3,291,795
HYDROXYLAMINE SALTS OF DITHIOCARBAMIC ACIDS
Alfred C. Whiton, Norristown, and Thomas E. Deger, Ambler, Pa., assignors to Pennsalt Chemicals Corporation, Philadelphia, Pa., a corporation of Pennsylvania
No Drawing. Filed Feb. 7, 1964, Ser. No. 343,209
9 Claims. (Cl. 260—247.1)

This invention deals with N,N-di-lower alkyl hydroxylamine salts of dithiocarbamic acids and with the process for preparing these novel compounds. The compounds of the invention have the structure:

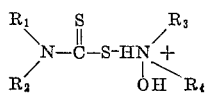

where $R_1$ and $R_2$ are the same or different alkyl, aryl, alkaryl, aralkyl groups containing from one to eighteen carbon atoms and which together may form a heterocyclic ring with the nitrogen atom, and $R_3$ and $R_4$ are lower alkyl radicals which may be the same or different.

Alkylamine salts of dithiocarbamic acids are known and have been employed in commerce as rubber accelerators, fungicides, bactericides, soil fumigants, and the like. However, hydroxylamine salts of dithiocarbamic acids have not been disclosed heretofore and this is possibly due to the fact that such salts are not formed when one attempts the direct reaction between an aliphatic amine, $CS_2$, and a hydroxylamine which would be expected to react as follows:

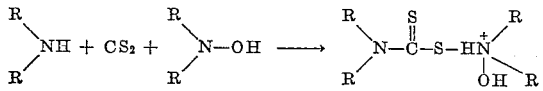

Presumably because of the weak basicity of the hydroxylamine in comparison to the basicity of the aliphatic amine, the hydroxylamine does not participate in the reaction, but the stronger aliphatic amine invariably does participate to form the aliphatic amine salt of the dithiocarbamic acid.

In accordance with this invention, however, hydroxylamine salts of dithiocarbamic acids may be prepared by treating a strong base salt of the dithiocarbamic acid (e.g. the alkali metal, ammonium or strongly basic amine salt) with a hydroxylamine salt of a mineral acid (e.g. the hydrochloride, nitrate, sulfate, etc.). The reaction is preferably carried out in a solvent system in which the by-product alkali metal, ammonium or amine salt is insoluble and in which the product hydroxylamine dithiocarbamate is soluble. Such a solvent system will allow a clean separation of the products obtained by the reaction. The general reaction may be formulated as follows:

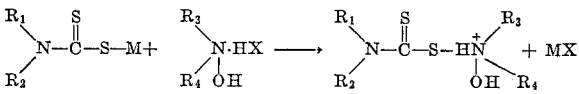

where M is the cation of a strong base such as an alkali metal, ammonium, a secondary amine and a tertiary amine, and X is the anion of a mineral acid.

The dithiocarbamates which participate in the above reaction to yield the compounds of this invention will, as indicated, include the strong base salts of N,N-dialkyl-dithiocarbamic acids such as dimethyldithiocarbamate, diethyldithiocarbamate, dibutyldithiocarbamate, methylethyldithiocarbamate, ethylbutyldithiocarbamate, N,N-dioctyldithiocarbamate, N-methyl-N-dodecyl-dithiocarbamate, N-butyl-N-octadecyldithiocarbamate, N,N-diocta-decyldithiocarbamate and the like; the aryldithiocarbamates such as diphenyldithiocarbamate, N-phenyl-N-naphthyldithiocarbamate, etc.; the aralkyl dithiocarbamates such as N,N-dibenzyldithiocarbamate, etc.; heterocyclic dithiocarbamates such as those derived from piperidine, morpholine and the like.

The hydroxylamines which will take part in the reaction and which will form the cation portion of the novel compounds of the invention will be the N,N-di-lower alkyl hydroxylamines wherein the alkyl group contains from one to six carbon atoms, such as N,N-dimethylhydroxylamine, N,N-diethylhydroxylamine, N,N-dibutylhydroxylamine, methylethylhydroxylamine, ethylpropylhydroxylamine, N,N-diamylhydroxylamine, N,N-dihexylhydroxylamine, ethylhexylhydroxylamine, and the like.

Surprisingly, when an N-monoalkyldithiocarbamate or an N-monoalkylhydroxylamine is used in the process (i.e. when either $R_1$, $R_2$, $R_3$ or $R_4$ is hydrogen) the reaction does not proceed to yield the compounds of the invention.

The process of the reaction occurs at room or ambient temperature and, as indicated, is preferably carried out in a solvent system in which the hydroxylamine dithiocarbamate is soluble and in which the alkali metal, ammonium or amine salt formed during the reaction is insoluble. Preferably, a polar solvent such as an alcohol will be used, and of these, ethanol, methanol, propanol, isobutanol, amyl alcohols and the like will be employed. Thus the process is preferably carried out in the presence of an aliphatic alcohol solution wherein said alcohol contains from one to six carbon atoms.

To carry out the process of the invention, the hydroxylamine salt in solvent is slowly added, preferably at room temperature, to a solvent solution of the dithiocarbamate. As the reaction proceeds, the salt formed separates out as a solid which is removed by filtration and the filtrate concentrated and worked up in the usual way to obtain the product.

The compounds of the invention are crystalline solids which are soluble in polar solvents (e.g. alcohols, ketones, etc.) and insoluble in water. The compounds are useful as polymerization inhibitors, as fungicides, and also serve to inhibit popcorn polymer formation in monomer recovery systems in butadiene-styrene polymerization installations.

The invention is further illustrated by the following examples:

*Example I*

Solid sodium diethyldithiocarbamate trihydrate (45 g., 0.2 mole) is dissolved in 250 ml. of absolute ethanol and filtered to remove the slight trace of insoluble material. A solution of diethylhydroxylamine hydrochloride is prepared in absolute ethanol by absorbing 7.3 g. (0.2 mole) of gaseous HCl in 100 ml. of solvent with cooling, then adding all at once 20.2 g. of 96.8% diethylhydroxylamine (contains 19.6 g., 0.22 mole, of $(C_2H_5)_2NOH$). The alcohol solution of sodium diethyldithiocarbamate is placed in a 3-necked flask equipped with a sealed stirrer, thermometer, reflux condenser, and dropping funnel, and the diethylhydroxylamine hydrochloride solution in alcohol is added dropwise with stirring over a 35 minute period. A crystalline precipitate of NaCl separates during the addition, and this is filtered off after the mixture is stirred at room temperature another 30 minutes. After it has air dried, the salt weighs 11.1 g. (95% yield). The yellow-orange alcohol filtrate containing the product is concentrated under vacuum until almost all the solvent has been removed, then 150 ml. of anhydrous ether and a few ml. of absolute alcohol are added to the slushy residue, the mixture is heated to reflux, filtered and cooled. Light tan crystals separate which are filtered and dried over KOH in a vacuum desiccator. The dried tan crystals weigh 12.7 g. (26.7% yield); the filtrate from recrystalization yields only 8 g. of a tarry residue of unknown material when it is evaporated in an open crystallizing dish. The product, diethylhydroxylammonium, N,N-diethyldithiocarbamate, in a melting point determination sinters slightly at 72° C. and melts at 75-80° C. Analysis for sulfur and nitrogen confirms the product.

*Example II*

A solution of N,N-diethylhydroxylamine hydrochloride in absolute ethanol is added at room temperature to a slight molar excess of sodium dibutyldithiocarbamate dissolved in absolute ethanol. Sodium chloride separates as the reaction proceeds and is removed by filtration at the end of the reaction. The alcoholic filtrate is concentrated and then diluted with water to precipitate the product. The product is filtered off and recovered as crystalline material melting at 44° to 47° C. Analysis for sulfur and nitrogen confirms the product as

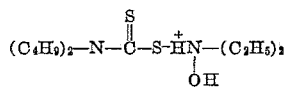

*Example III*

Instead of using N,N-dibutyldithiocarbamate in Example 2, morpholine dithiocarbamate is used to yield

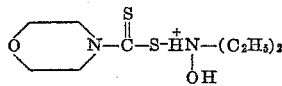

*Example IV*

Following the procedure of Example 1, N-ethyl-N-hexylhydroxylamine sulfate in isopropanol is reacted with ammonium diphenyldithiocarbamate to yield

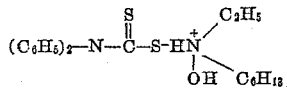

*Example V*

The compound

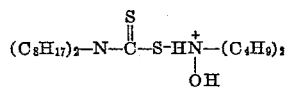

is prepared from triethylammonium dioctyldithiocarbamate and N,N-dibutylhydroxylammonium chloride in accord with the process of Example 1.

*Example VI*

When a solution of N,N-diethylhydroxylamine hydrochloride in methanol is slowly added at room temperature to an equivalent amount of ammonium phenyldithiocarbamate dissolved in methanol, only a trace of ammonium chloride separates from the reaction mixture and no diethylhydroxylammonium N-phenyldithiocarbamate can be isolated.

*Example VII*

As in Example 6, the reaction of N-cyclohexylhydroxylamine hydrochloride in absolute ethanol with sodium diethyl dithiocarbamate fails to yield N-cyclohexylhydroxylammonium diethyldithiocarbamate.

It will be understood that numerous changes and modifications may be made from the above description and examples without departing from the spirit and scope of the invention.

We claim:
1. A compound of the structure

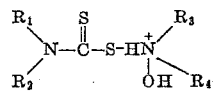

where $R_1$ and $R_2$ are hydrocarbon groups selected from the group consisting of alkyl, aryl, alkaryl and aralkyl having from one to eighteen carbon atoms and together with the nitrogen form piperidino or morpholino; $R_3$ and $R_4$ are lower alkyl.

2. A compound as in claim 1 wherein $R_1$, $R_2$, $R_3$ and $R_4$ are alkyl.
3. The acid addition salt of diethylhydroxylamine and N,N-diethyldithiocarbamate.
4. The acid addition salt of diethylhydroxylamine and N,N-dibutyldithiocarbamate.
5. The acid addition salt of dibutylhydroxylamine and N,N-dioctyldithiocarbamate.
6. A compound as in claim 1 wherein $R_1$ and $R_2$ taken together form piperidino or morpholino.
7. The acid addition salt of diethylhydroxylamine and morpholine dithiocarbamate.
8. A compound as in claim 1 where $R_1$ and $R_2$ are aryl.
9. The acid addition salt of ethylhexylhydroxylamine and N,N-diphenyldithiocarbamate.

References Cited by the Examiner

UNITED STATES PATENTS 2,302,749  11/1942  Dean _____ 260—501

ALEX MAZEL, *Primary Examiner.*

HENRY R. JILES, *Examiner.*

J. TOVAR, *Assistant Examiner.*